(12) United States Patent
Nippert (10) Patent No.: US 8,857,603 B1
(45) Date of Patent: Oct. 14, 2014

(54) SYSTEM FOR ADJUSTING CONVEYOR DIRECTION

(71) Applicant: Alan Nippert, Lizella, GA (US)

(72) Inventor: Alan Nippert, Lizella, GA (US)

( * ) Notice: Subject to any disclaimer, the term of this patent is extended or adjusted under 35 U.S.C. 154(b) by 0 days.

(21) Appl. No.: 13/923,141

(22) Filed: Jun. 20, 2013

(51) Int. Cl.
*B65G 39/16* (2006.01)
*B65G 15/64* (2006.01)

(52) U.S. Cl.
CPC .................................... *B65G 15/64* (2013.01)
USPC .......................................... 198/807; 198/806

(58) Field of Classification Search
CPC ................................ B65G 39/16; B65G 15/64
USPC ...................................... 198/806, 807, 810.03
See application file for complete search history.

(56) References Cited

U.S. PATENT DOCUMENTS

| | | | |
|---|---|---|---|
| 2,821,291 A | 1/1958 | Schott | |
| 2,907,450 A | 10/1959 | Reid | |
| 3,590,984 A * | 7/1971 | Nolte | 198/806 |
| 4,178,171 A * | 12/1979 | Steck et al. | 75/350 |
| 4,629,062 A | 12/1986 | Silverthornn et al. | |
| 5,373,935 A | 12/1994 | Anderson | |
| 5,511,650 A | 4/1996 | Hurworth | |
| 5,826,703 A | 10/1998 | Altemus, Jr. et al. | |
| 6,116,410 A * | 9/2000 | Malmberg | 198/806 |
| 6,131,726 A | 10/2000 | Hovsto et al. | |
| 6,180,317 B1 * | 1/2001 | Allen et al. | 430/280.1 |
| 6,321,900 B1 | 11/2001 | Micklethwaite | |
| 6,550,606 B2 | 4/2003 | Tapp | |
| 6,776,280 B2 * | 8/2004 | Hovstø et al. | 198/806 |
| 7,134,544 B1 | 11/2006 | Kilper et al. | |
| 7,614,493 B2 | 11/2009 | Dowling et al. | |
| 7,614,494 B2 | 11/2009 | Hinson | |
| 2004/0050671 A1 * | 3/2004 | Hovsto et al. | 198/806 |
| 2009/0250322 A1 | 10/2009 | Jager | |

FOREIGN PATENT DOCUMENTS

FR 2585679 * 2/1987 .................... 198/806

* cited by examiner

*Primary Examiner* — James R Bidwell
(74) *Attorney, Agent, or Firm* — C. Brandon Browning; Maynard, Cooper & Gale, PC (57) ABSTRACT

The present invention relates to an apparatus for aligning a bidirectional conveyor belt. The apparatus comprises two parallel idler rollers mounted in a parallel configuration between two brackets. The two rollers rotate in opposite directions and are mounted to the underside of a bidirectional conveyor belt. During operation, the apparatus shifts upward and downward along the axis of a shaft, allowing each of the rollers to come into contact with the conveyor belt in an alternating manner. The idler rollers act to maintain alignment of the conveyor belt in either the forward or reverse directions, thus preventing erosion of the belt and the conveyor system. The invention is further directed a system for maintaining the alignment of a conveyor belt using the idler assembly, ad a method of aligning a bidirectional continuous conveyor belt.

15 Claims, 7 Drawing Sheets

SYSTEM FOR ADJUSTING CONVEYOR DIRECTION

FIELD OF THE INVENTION

The present invention relates to conveyor systems and more particularly to a conveyor return idler assembly.

BACKGROUND OF THE INVENTION

Conveyor systems are used to move various types of goods in both commercial and manufacturing settings. Conveyors typically include a system comprising a pulley at one end and some type of driving mechanism at the opposite end. In general, a continuous looped belt, comprising an upper portion for moving goods and a parallel lower return portion, runs around the pulley and drive mechanisms.

The goods conveyed on such a system may shift or move slightly during transmission, or they may be placed on the belt in an unbalanced position. This unbalanced condition may result in belt wear or displacement. Idler systems have been developed to compensate for displaced or unbalanced belt loads. Here, a belt centralizing idler is positioned on the return portion of the belt. The idler consists of a roller apparatus which presses up against the belt and senses the belt and idler centers of gravity. If the centers of gravity are equal, the idler remains in a straight horizontal direction and in the direction of the belt. A difference between the two centers of gravity causes the idler to turn diagonally in the direction of the misaligned belt due to the presence of a belt weight present in the roller. This change in direction centers the belt on the conveyor system. The idler then returns to its original position on the belt.

The above-described centralizing idler is operational only while the conveyor belt travels in one direction (i.e., the forward direction). It is often desirable for a conveyor to transport goods in both the forward and reverse directions (i.e., bi-directional). Current bi-directional belt systems require manual operation in the reverse direction or the use of additional center drive assemblies and pulleys. These systems are expensive, cumbersome and require additional labor. What is needed in the art therefore is a bi-directional centralizing conveyor system which does not require manual operation or additional pulleys.

SUMMARY OF THE INVENTION

In one embodiment, the present invention relates to an apparatus for aligning a bidirectional conveyor belt, comprising two parallel idler rollers mounted between two brackets. The two rollers rotate in opposite directions. When mounted to the underside of a bidirectional conveyor belt, the apparatus shifts upward and downward along the axis of the shaft, allow each of the rollers to come into contact with the conveyor belt in an alternating manner. The idler rollers act to maintain alignment of the conveyor belt in either the forward or reverse directions, thus preventing erosion of the belt and the conveyor system.

In an additional embodiment, the invention is directed a system for maintaining the alignment of a conveyor belt. The system comprises a centralizing assembly with two parallel mounted idler rotatable rollers, where the idlers rollers rotate in opposite directions. The idler rollers rotate upward and downward, alternating contact with the belt. The system also utilizes an actuator to raise and lower the rollers so they contact the conveyor belt.

The invention also relates to a method of aligning a bidirectional continuous conveyor belt. A centralizing assembly with two parallel idler rotatable rollers is mounted to the underside of the forward portion of a conveyor belt. The idler rollers rotate in opposite directions and move upward and downward, alternating contact with the belt. The method further provides raising the first idler roller of the centralizing assembly until it comes into frictional contact with the bottom surface of the upper portion of the continuous conveyor belt. Forward motion of the conveyor belt is initiated causing rotation of the first idler roller and alignment of the conveyor belt in the forward direction. The first idler roller is lowered and thus disengaged allowing the second idler roller to come into contact with the bottom surface of the upper portion of the continuous conveyor belt. Movement of the belt in the reverse direction is then initiated, allowing the second idler roller of the centralizing assembly to rotate in a direction opposite the first idler roller and align the conveyor belt in the reverse direction.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
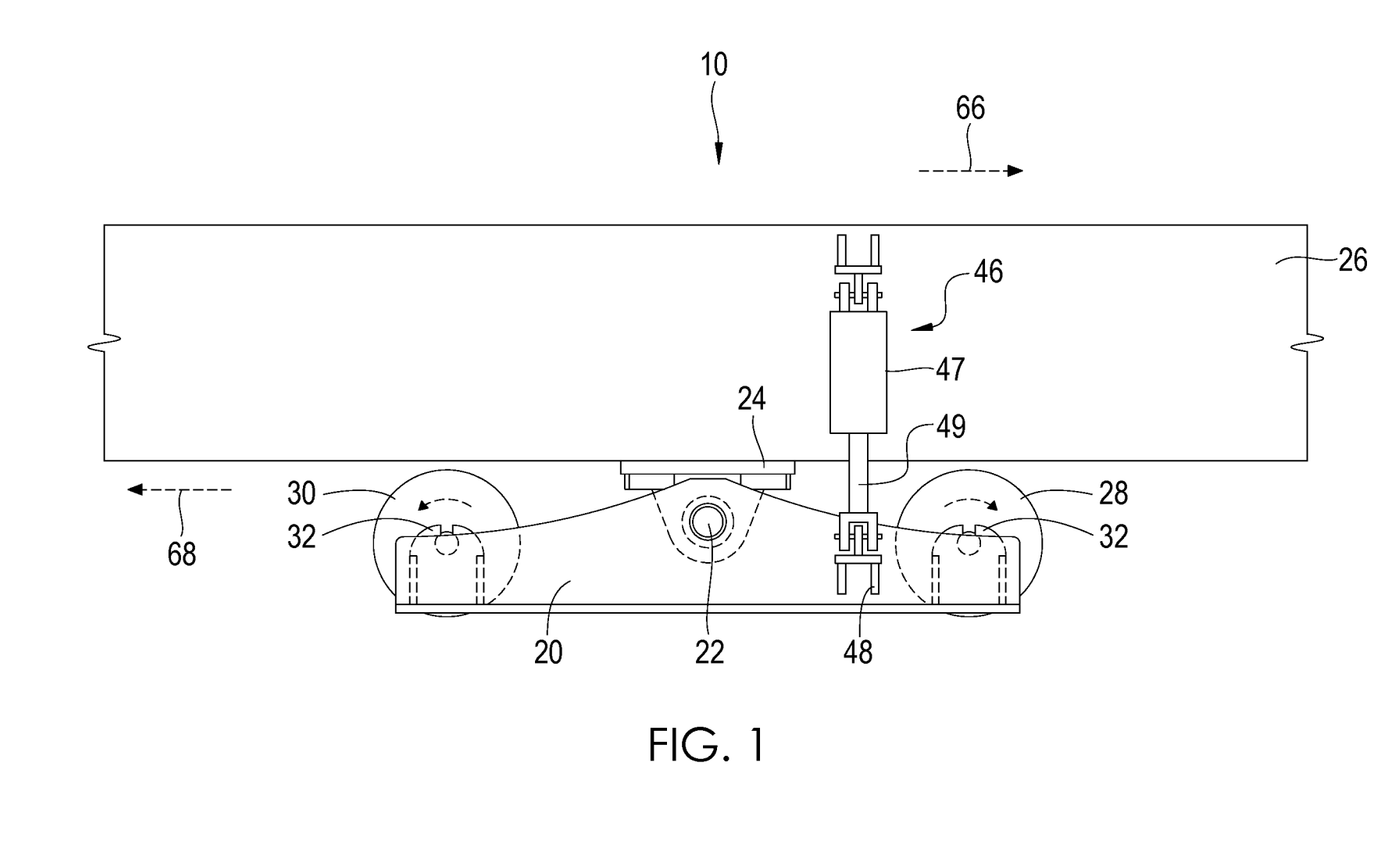
FIG. 1 is a side view of the conveyor return idler assembly of the invention.
Figure 2:
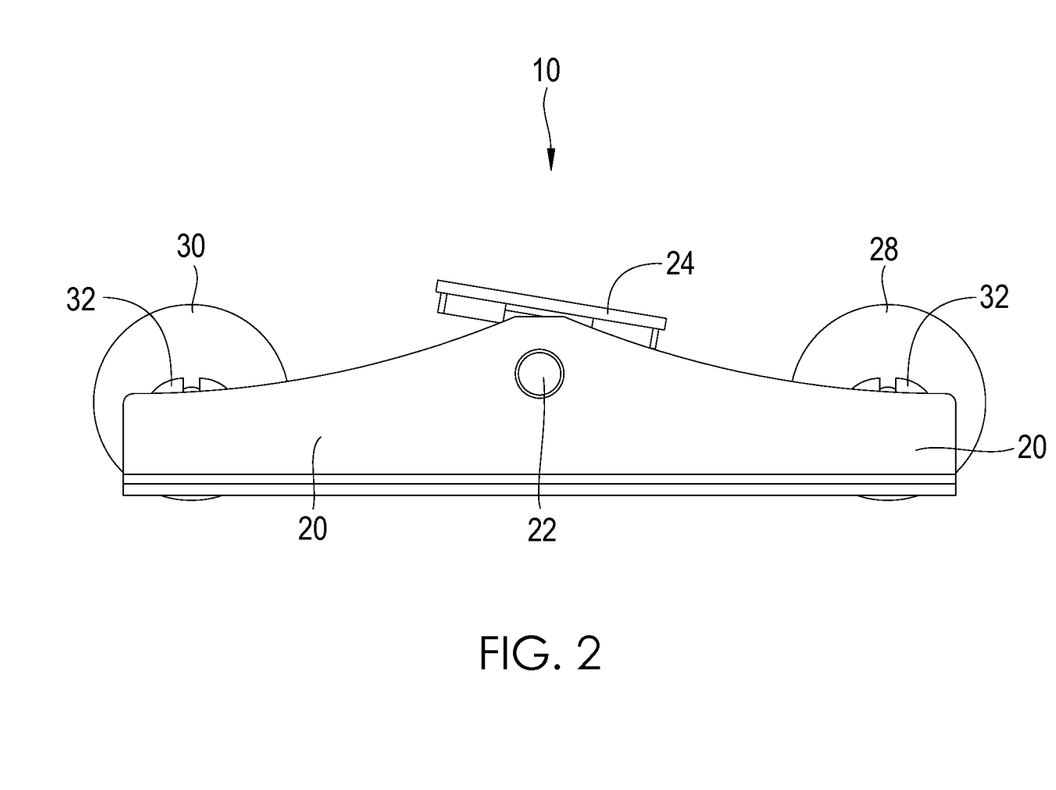
FIG. 2 is a side view of the conveyor return idler assembly of the invention.
Figure 7A:
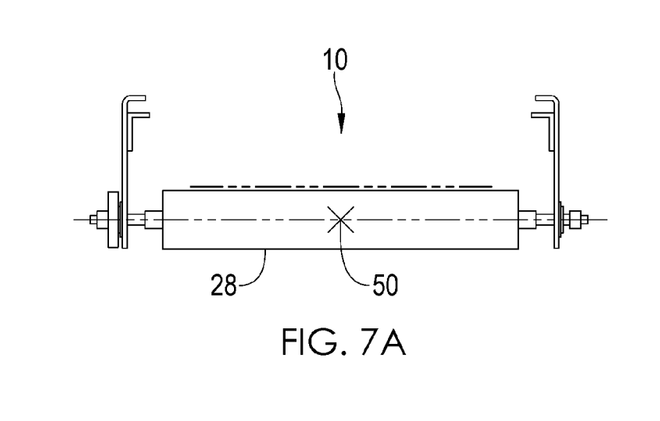
FIG. 7A is a side view of a belt centralizing idler in an aligned position.
Figure 7B:
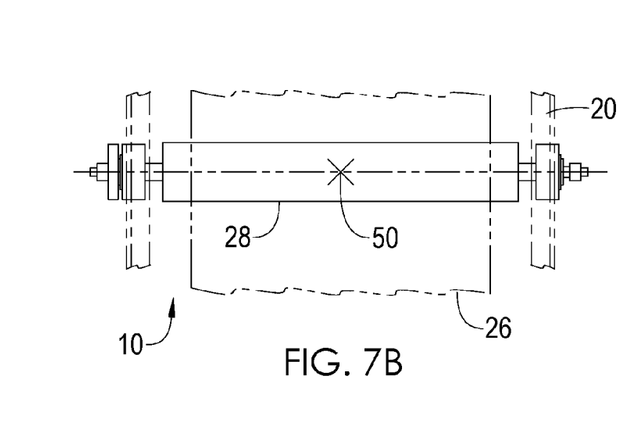
FIG. 7B is a top view of a belt centralizing idler in an aligned position.

As shown in FIGS. 1-6, an embodiment of the present invention herein referred to as a conveyor return idler assembly 10 includes two roller shaped idlers 28 and 30. Such idlers 28 and 30 are known to one of skilled in the art. Exemplary idlers include those manufactured by Brelko Conveyor Products (Johannesburg, South Africa) and Sandvik AB (Stockholm, Sweden). One of skill in the art will understand that the presently disclosed invention is not limited to these specific idlers. Referring now to FIGS. 7A and 7B, exemplary idler 28 is illustrated with a center of gravity 50. As will be described in more detail below with specific reference to FIGS. 8A and 8B, each idler 28 and 30 moves from side to side horizontally along axis 50 (as indicated by arrows 52 and 54, respectively) in order to align with the direction of movement of conveyor belt 26. Such movement or tilting occurs in response to a change in the center of gravity of the idler 28 as compared to the center of gravity of the belt 26. Referring now to FIG. 1, idlers 28 and 30 additionally rotate in opposite directions, matching the movement of the conveyor belt 26 in either the forward or backward direction. Here, idler 28 rotates in a clockwise direction while idler 30 rotates in a counter-clockwise direction.

Figure 3:
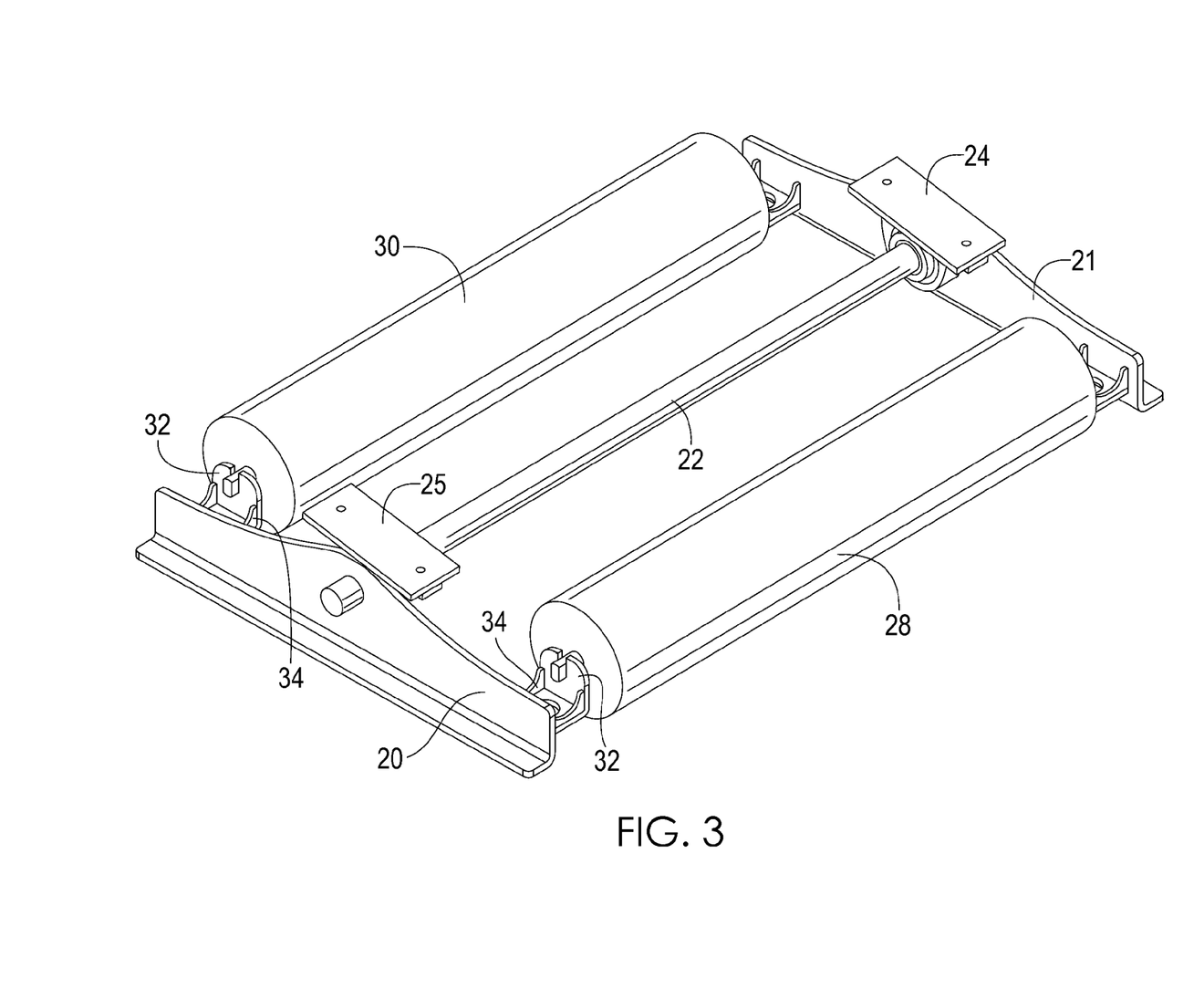
FIG. 3 is a top view of the conveyor return idler assembly of the invention.

As illustrated in FIG. 3, idlers 28 and 30 are rotatably mounted at each end to the respective ends of two triangular-shaped idler brackets 20 and 21. Idler 28 is parallel to idler 30, while bracket 21 is parallel to bracket 21, conferring a generally square confirmation to apparatus 10. The brackets 20 and 21 and idlers 28 and 30 may be constructed from any durable material as is known in the art, for example a metal. As shown in the figures, the assembly 10 further includes a cylindrical shaft 22. Shaft 22 is rotatably mounted at its respective ends to the first idler bracket 20 and the second parallel idler bracket 21 (FIG. 3) near the upper-most portion or approximate apex of the brackets. The shaft 22 is so positioned to be parallel to idlers 28 and 30 and perpendicular to brackets 20 and 21. Shaft 22 is mounted at the approximate midpoint of the inside surfaces of the idler brackets 20 and 21 and secures a pair movable mount plates 24 and 25 located adjacent to the inside surfaces of brackets 20 and 21. Movable mount plates are located parallel to brackets 20 and 21. As illustrated in FIG. 1, assembly 10 is located on the underside or return portion of a continuous conveyor belt 26. Belt 26 is in the form of a loop (not shown) with an upper conveying portion and a lower return portion. Any type of continuous conveyor belt, as is known to one of skill in the art, may be used with the present invention.

Figure 4:
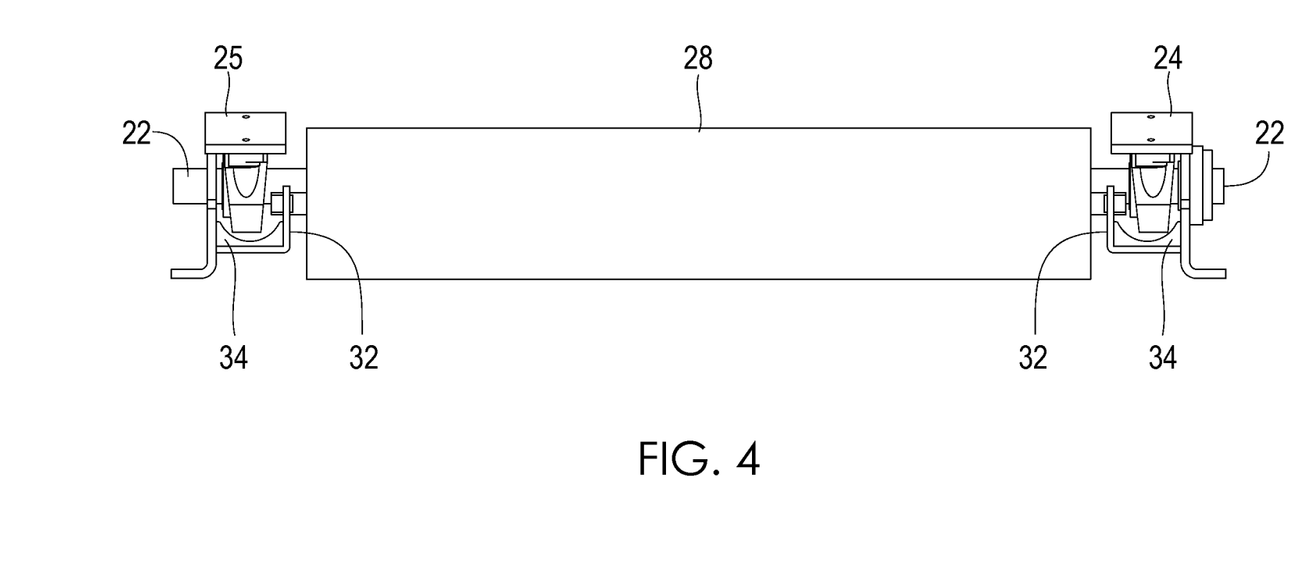
FIG. 4 is a side view of the conveyor return idler assembly of the invention.
Figure 5:
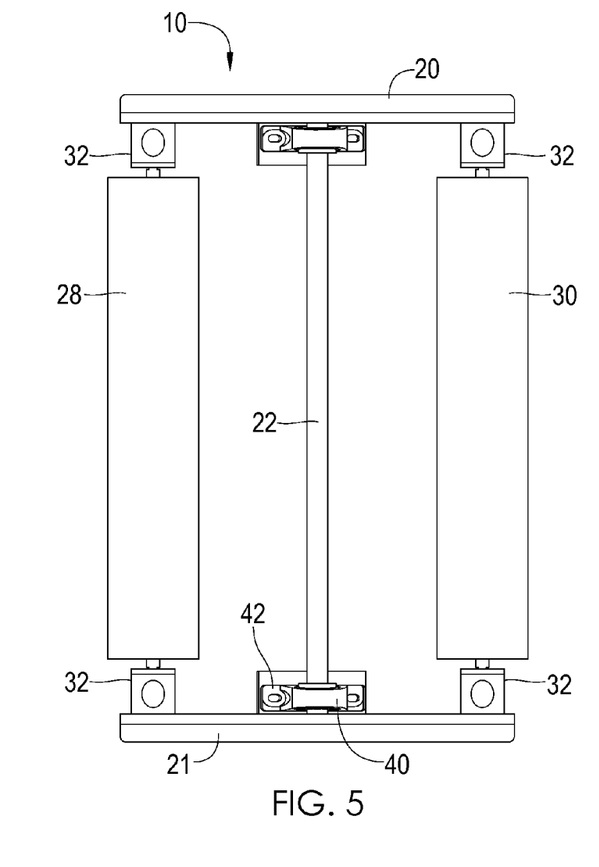
FIG. 5 is an additional top view of the conveyor return idler assembly of the invention.
Figure 6:
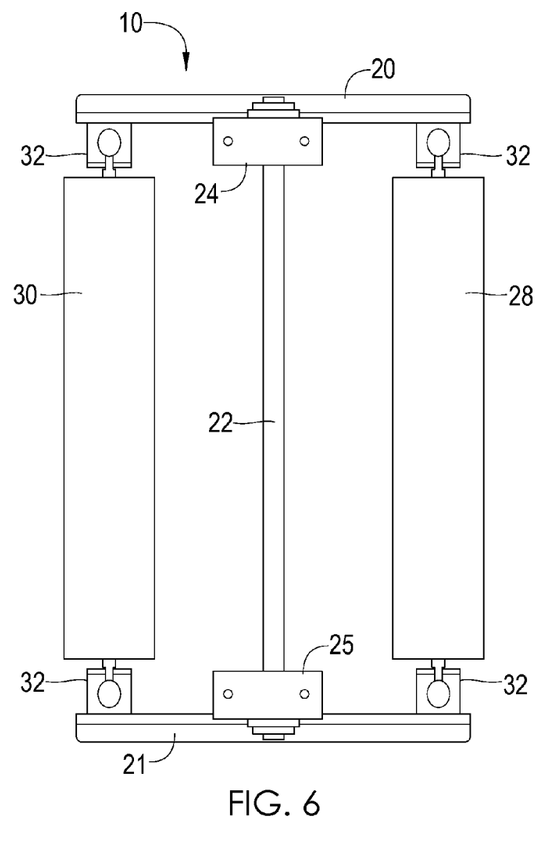
FIG. 6 is a bottom view of the conveyor return idler assembly of the invention.

Turning now to FIG. 3, idlers 28 and 30 are shaped as long tubes or rollers and are rotatably attached at their respective ends to idler brackets 20 and 21. The idlers 28 and 30 are rotatably supported between idler brackets 20 and 21. An L-shaped shaft bracket 32 abuts against each end of the rollers 28 and 30 and secures the rollers 28 and 30 to the idler brackets 20 and 21 with two vertically aligned shaft bracket gussets 34 (see also FIG. 4). The two mount plates 24 and are attached to the rotating shaft 22 at the terminal ends. Referring now to FIG. 1, belt 26 slides on the smooth surface defined by the mount plates 24 and 25. The shaft 22 is attached to the bottom side of the mount plate 24 via mounting bracket 40 and mounting screws 42. The mounting bracket 40 and mounting screws 42 secure the mount plate 24 but allow the plate 24 to rotate (FIG. 4). As will be described in more detail below, the plate 24 swivels or tilts up and down along the rotational axis provided by the shaft 22.

Referring again to FIG. 1, the assembly 10 further includes a hydraulic actuator 46 which is secured to the idler bracket 20 at by actuator bracket 48. In one embodiment, the actuator 46 consists of a cylinder barrel 47, into which a piston 49 connected to a piston rod (not shown) moves in and out. The barrel 47 is closed on one end by the cylinder bottom (not shown) and the other end by the cylinder head (not shown) where the piston rod exits the barrel 47.

Figure 9A:
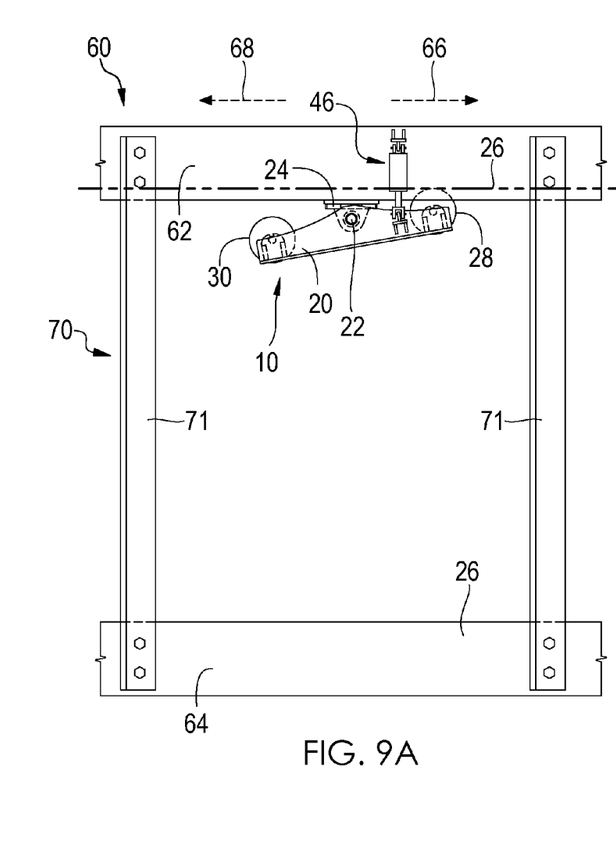
FIG. 9A is a side view of an engaged conveyor return idler assembly of the invention in forward direction.
Figure 9B:
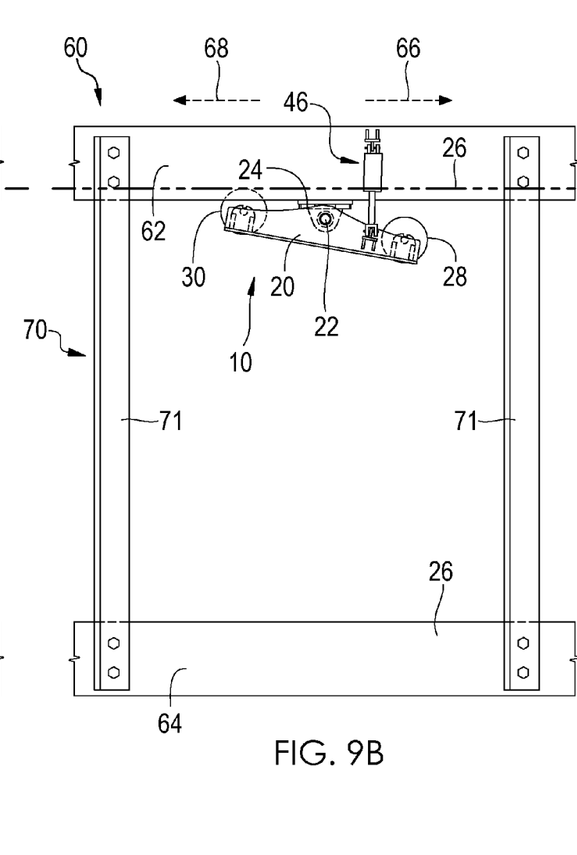
FIG. 9B is a side view of a disengaged conveyor return idler assembly of the invention in the reverse direction.

In operation, the assembly 10 of the present disclosure is mounted to the underside of the upper portion 62 (i.e., forward) of a continuous belt system 60, as illustrated in FIGS. 9A and 9B. The conveyor belt illustrated in FIGS. 9A and 9B is for illustration only as the present assembly 10 may be utilized in a variety of systems. Here, the belt system 60 includes a conveyor frame 70 comprising a number of vertical and horizontal supports 71. The particular frame construction of the system 60 may vary. The frame 70 may rest on the ground or be supported off the ground by support members (not shown), as is appropriate for a particular application.

As illustrated in FIGS. 7A and 7B, a properly aligned belt slides along the smooth surface of plates 24 and 25. The center of gravity of idler 28 is aligned with that of the belt 26. Here, the idler is aligned horizontally and rotates in the same direction of the movement of belt 26. Belt 26 continues moving in a straight, forward direction and does not deviate from the surface of plates 24 and 25. This configuration prevents untimely wear or other damage to the belt 26 or other parts of the conveyor assembly.

Turning again to FIG. 9A, the continuous belt 26 includes an upper or forward portion 62 and a lower or return portion 64. Goods (not shown) are first loaded onto the top surface of the forward portion 62 for transport in the forward direction, as indicated by arrow 66. The conveyor operator (not shown) then initiates a signal to the belt system 60 to begin movement in the forward direction 66. After receiving the signal initiating movement in the forward direction, the hydraulically activated actuator 46 retracts the piston 49 into barrel 47, causing the shaft 22 to rotate in a counter clockwise direction. This rotation of shaft 22 initiates movement or tilting of the ends of idler brackets 20 and 21 and idler 28 in the upward direction, accompanied by a concurrent movement or tilting of the opposite ends of the idler brackets 20 and 21 (i.e., the ends comprising idler 30) in the downward direction. As a result, idler 28 frictionally engages with the underside of belt 26 and begins to rotate in a clockwise or forward direction.

Figure 8A:
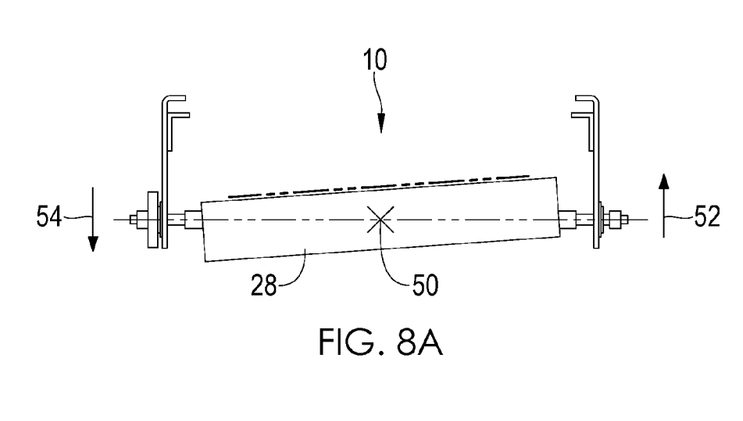
FIG. 8A is a side view of a belt centralizing idler in a misaligned position.
Figure 8B:
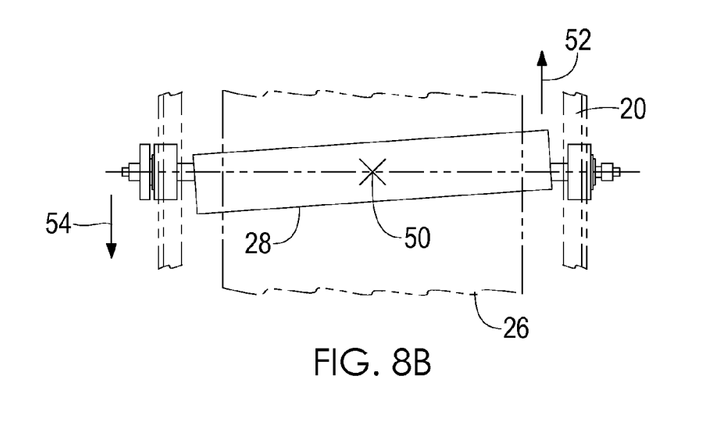
FIG. 8B is a top view of a belt centralizing idler in a misaligned position.

In the event that the goods on the belt 26 become unbalanced and/or the belt 26 becomes misaligned and moves off the surface of plates 24 and 25, idler 28 moves or tilts along axis 50 (movement indicated by arrows 52 and 54, respectively) in order to maintain frictional contact with the conveyor belt 26 and to correct any resulting misalignment of the belt 26 (FIGS. 8A and 8B). Such movement or tilting occurs in response to a change in the center of gravity of the idler 28 as compared to the center of gravity of the belt 26. If the centers of gravity are mismatched, idler 28 rotates slightly at axis 50 until the idler 28 and the belt 26 are horizontally aligned. The tilting of the idler 28 is accompanied by a tilting of the plates 24 and 25 in the same direction of the movement of belt 26 and realignment of the belt 26. The idler 28 returns to its original orientation (i.e., perpendicular to idler brackets 20 and 21) when the centers of gravity of the idler 28 and the belt 26 are parallel. In this configuration, the idler 28 is aligned horizontally and rotating in the same direction as belt 26, as illustrated in FIGS. 7A and 7B.

FIG. 9B is an illustration of the operation of the assembly 10 when the belt 26 is operating in the return or reverse direction, as indicated by arrow 68. It is to be understood that the apparatus 60 illustrated in FIG. 9B includes corresponding structures as shown in FIG. 9A. Here, the forward motion of the belt 26 is stopped by the operator. Once the hydraulically activated actuator 46 receives the signal that forward movement of the belt 26 has stopped, the piston 49 expands from barrel 47, causing the shaft 22 to rotate in a clockwise direction. This rotation of shaft 22 initiates movement or tilting of the end of idler brackets 20 and 21 and idler 28 in the downward direction and a concurrent movement or tilting of the opposite end of the idler brackets 20 and 21 (i.e., the ends containing idler 30) in an upward direction. As a result, idler 28 disengages from the underside of belt 26.

Referring again to FIG. 9B, the operator then initiates a signal for the belt to move in the reverse direction. Upon receipt of this signal, the piston 49 further expands from barrel 47, continuing to tilt the ends of idler brackets 20 and 21 and idler 28 in the downward direction and a concurrent movement or tilting of the opposite end of the idler brackets 20 and 21 (i.e., the ends containing idler 30) in an upward direction. Idler 30 then frictionally engages the underside of belt 26. Reverse movement of the belt 26 in the direction of arrow 68 causes rotation of idler 30 in a counter-clockwise direction. Similar to the action of idler 28 (as illustrated in FIGS. 8A and 8B), idler 30 moves or tilts along the axis 50 as (indicated by arrows 52 and 54, respectively) in order to maintain frictional contact with the conveyor belt 26. Such movement or tilting occurs in response to a change in the center of gravity of the idler 30 as compared to the center of gravity of the belt 26. If the centers of gravity are mismatched or the belt slides from the surface of plates 24 and 25, idler 30 rotates slightly at axis 50 until the idler 30 and the belt 26 are horizontally aligned and the belt 26 is centered on plates 24 and 25. The idler 30 then returns to its original orientation (i.e., perpendicular to idler brackets 20 and 21) when the centers of gravity of the idler 28 and the belt 26 are parallel. In this configuration, the idler 30 is aligned horizontally and rotating in the same direction as belt 26, as illustrated in FIGS. 7A and 7B.

The assembly 10 described herein allows for the continual alignment of a conveyor belt in both the forward and reverse directions while utilizing unidirectional idlers. In one exemplary embodiment, multiple assemblies 10 may be placed along the belt 26 length to ensure proper alignment along the conveyor system, as is known to one of skill in the art.

The present disclosure contemplates changes in the above constructions without departing from the scope of the invention. All matter contained in the above description are shown in the accompanying drawings should be interpreted as illustrative and not limiting.

Now, therefore, the following is claimed:

1. An apparatus for aligning a bidirectional continuous conveyor belt, comprising:
    a first idler roller rotatably mounted to the respective ends of a first and second bracket;
    an actuator secured to the first bracket,
    a second idler roller rotatably mounted to the opposite respective ends of the first and second bracket, wherein the second idler roller is parallel to the first idler roller; and
    a cylindrical rotating shaft mounted to the inside surface of the first and second brackets, wherein the shaft is parallel to the first and second idler rollers,
    wherein the first and second idler rollers rotate in opposite directions.

2. The apparatus of claim 1, wherein the actuator is hydraulic.

3. The apparatus of claim 1, wherein the first and second idler rollers are metal.

4. A system for aligning a bidirectional continuous conveyor belt, comprising:
    (a) a centralizing assembly comprising
        a first idler roller rotatably mounted to the respective ends of a first and second bracket;
        a second idler roller rotatably mounted to the opposite respective ends of the first and second bracket, wherein the second idler roller is parallel to the first idler roller; and
        a cylindrical rotating shaft mounted to the inside surface of the first and second brackets, wherein the shaft is parallel to the first and second idler rollers, wherein the first and second idler rollers rotate in opposite directions;
    (b) an actuator mounted to one end of the first bracket;
    (c) a frame; and
    (d) a bidirectional conveyor belt.

5. The system of claim 4, wherein the actuator is hydraulic.

6. The system of claim 4, wherein the first and second idler rollers are metal.

7. The system of claim 4, wherein the conveyor belt is continuous.

8. A method of aligning a bidirectional continuous conveyor belt, comprising:
    (a) providing a centralizing assembly comprising:
        a first idler roller rotatably mounted to the respective ends of a first and second bracket;
        a second idler roller rotatably mounted to the opposite respective ends of the first and second bracket, wherein the second idler roller is parallel to the first idler roller;
        a cylindrical rotating shaft mounted to the inside surface of the first and second brackets, wherein the shaft is parallel to the first and second idler rollers, wherein the first and second idler rollers rotate in opposite directions; and
        a bidirectional conveyor belt;
    (b) mounting the centralizing assembly to the bottom surface of the upper portion of a the bidirectional conveyor belt;
    (c) raising the first idler roller of the centralizing assembly until it comes into frictional contact with the bottom surface of the upper portion of the conveyor belt;
    (d) initiating forward motion of the conveyor belt, thereby allowing the first idler roller to rotate and align the conveyor belt in the forward direction;
    (e) halting forward motion of the conveyor belt;
    (f) lowering the first idler roller of the centralizing assembly so that it disengages with the continuous conveyor belt, thereby allowing the second idler roller to come into contact with the bottom surface of the upper portion of the continuous conveyor belt;
    (g) initiating reverse motion of the conveyor belt, thereby allowing the second idler roller of the centralizing assembly to rotate in a direction opposite the first idler roller and align the conveyor belt in the reverse direction.

9. The method of claim 8, wherein the raising and lowering of the first and second idlers is done with an actuator.

10. The method of claim 8, wherein the actuator is hydraulic.

11. The method of claim 8, wherein the first and second idler rollers are metal.

12. The method of claim 8, wherein the bidirectional conveyor belt is continuous.

13. An apparatus for aligning a bidirectional continuous conveyor belt, comprising:
    a first idler roller rotatably mounted to the respective ends of a first and second bracket, the first idler roller being configured to rotate in a clockwise direction,
    a second idler roller rotatably mounted to the opposite respective ends of the first and second bracket, the second idler roller being configured to rotate in a counter-clockwise direction,
    an actuator coupled to the first bracket, and
    a shaft mounted to and between the first and second bracket about which the first and second bracket are configured to pivot.

14. The apparatus of claim 13 comprising a first orientation and a second orientation, the first orientation including the first idler roller being in contact with a conveyor belt and the second idler roller being spaced apart from the conveyor belt and the second orientation including the second idler roller being in contact with a conveyor belt and the first idler roller being spaced apart from the conveyor belt.

15. The apparatus of claim 13 comprising a first orientation and a second orientation, the first orientation including the first idler roller being in a first raised position relative to the second idler roller and the second orientation including the second idler roller being in a second raised position relative to the first idler roller.

* * * * *